(12) United States Patent
Hynninen

(10) Patent No.: US 6,412,217 B1
(45) Date of Patent: Jul. 2, 2002

(54) PLANT SHOE

(76) Inventor: Tapio Hynninen, Tuomistonmäentie 11, FIN-31860 Tursa (FI)

(*) Notice: Subject to any disclaimer, the term of this patent is extended or adjusted under 35 U.S.C. 154(b) by 0 days.

(21) Appl. No.: 09/554,877

(22) PCT Filed: Jun. 13, 1997

(86) PCT No.: PCT/FI97/00376

§ 371 (c)(1),
(2), (4) Date: Oct. 13, 2000

(87) PCT Pub. No.: WO97/47181

PCT Pub. Date: Dec. 18, 1997

(30) Foreign Application Priority Data

Jun. 14, 1996 (FI) .............................. 960359 U

(51) Int. Cl.[7] .............................................. A01G 13/02
(52) U.S. Cl. ...................................................... 47/20.1
(58) Field of Search ................................. 47/27, 32, 44, 47/40.5, 28.1

(56) References Cited

U.S. PATENT DOCUMENTS

| 219,987 | A | | 9/1879 | Scott et al. | |
|---|---|---|---|---|---|
| 1,712,093 | A | * | 5/1929 | Schindler | |
| 1,931,602 | A | * | 10/1933 | Colman | |
| 3,571,972 | A | * | 3/1971 | Carter, Jr. | 47/25 |
| 4,584,789 | A | * | 4/1986 | Jean et al. | 47/25 |
| 4,642,938 | A | * | 2/1987 | Georges et al. | 47/2 |
| 4,995,192 | A | | 2/1991 | DeWid | |
| 5,184,421 | A | * | 2/1993 | Meharg | 47/66 |
| 5,878,528 | A | * | 3/1999 | Pattyn | 47/25 |

FOREIGN PATENT DOCUMENTS

| CH | 675812 | 11/1990 |
|---|---|---|
| DE | 1 055 276 | 4/1959 |
| DE | 67 280 | 5/1969 |
| DE | 4327753 | 6/1994 |
| EP | 0579162 | 1/1994 |
| FI | 68494 | 6/1985 |
| GB | 2 053 640 | 11/1981 |
| GB | 2 088 185 | 9/1982 |

* cited by examiner

Primary Examiner—Peter M. Poon
Assistant Examiner—Kevin Jakel
(74) Attorney, Agent, or Firm—Larson & Taylor, PLC

(57) ABSTRACT

A shoe (1) for use at the roots of a planted seedling or a natural seedling, made of mouldering material and having a hole (4) for the plant stem in its center and a slit (3) between the hole and the shoe edge. The shoe (1) is made convex and the convex portion has grooves (2), cavities or pockets to collect materials.

12 Claims, 1 Drawing Sheet

PLANT SHOE

The invention relates to a mouldering shoe for use at the root of a planted seedling or a natural seedling according to the the introductory chapter of patent claim 1.

Previously known from the Finnish patent number 68494 is a protective sheet placed on the ground around the plant stem. In the sheet centre there is a hole and from the shield edge to the hole a slit is cut enabling the sheet to be mounted around the plant without threading. The sheet contains fertilizer soluble in soil.

The disadvantage of a protective sheet as per the above publication is that the sheet doesn't remain reliably on the ground. As a square flat sheet it does not follow the forms of the ground. Under it there are shelters for moles. For instance, no materials can stay on the smooth sheet surface by windy weather. The sheet material is brittle and breaks easily even though its hard and then the centre hole edge can cause damage to the plant bottom by their mutual motion.

By means of a plant shoe as per this invention the above problems are solved. The invention is characterized in that the shoe is made of a stiff sheet, convex upward and the convex portion containing channels or pockets to collect materials. Other features-characterizing the invention are disclosed in the subclaims.

The advantage of the invention is that the cuplike up-side-down convex form prevents the wind to grasp the shoe. Further, the channels, pockets or cavities on the convex surface collect water, litter from trees, such as needles, and remnants of soil and plants as ballast onto the plant shoe. Thanks to its water-collecting forms, the protective shoe retains moisture much longer, whereat different kinds of additional substances are conveniently dissolved in the soil as nutrients for the plant.

The triangular form is advantageous by fitting the shoe, since it enables turning the shoe in different positions according to the hindrances in and also the roughness of the terrain. It is also always possible to get all three sheet corners against the ground, at least on tilting the sheet. In the sheet material there are fibre bonds, which get weaker when wet, whereat the sheet sinks against the ground and adheres to some spots in the ground. The channels, cavities and pockets still remain on the surface.

Figure 1:
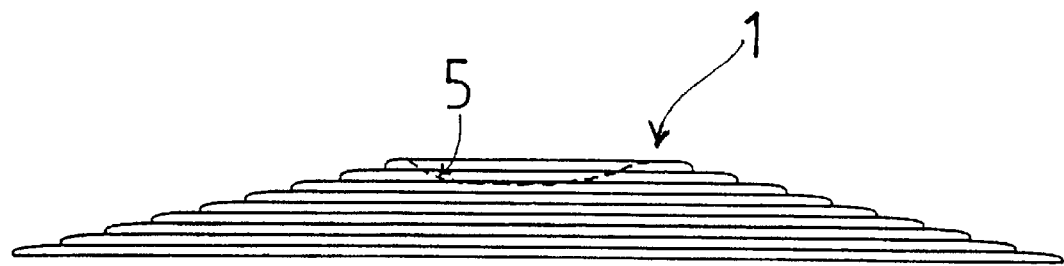

In the following the invention is disclosed with reference to the enclosed drawing, where FIG. 1 is a side view of the shoe.

Figure 2:
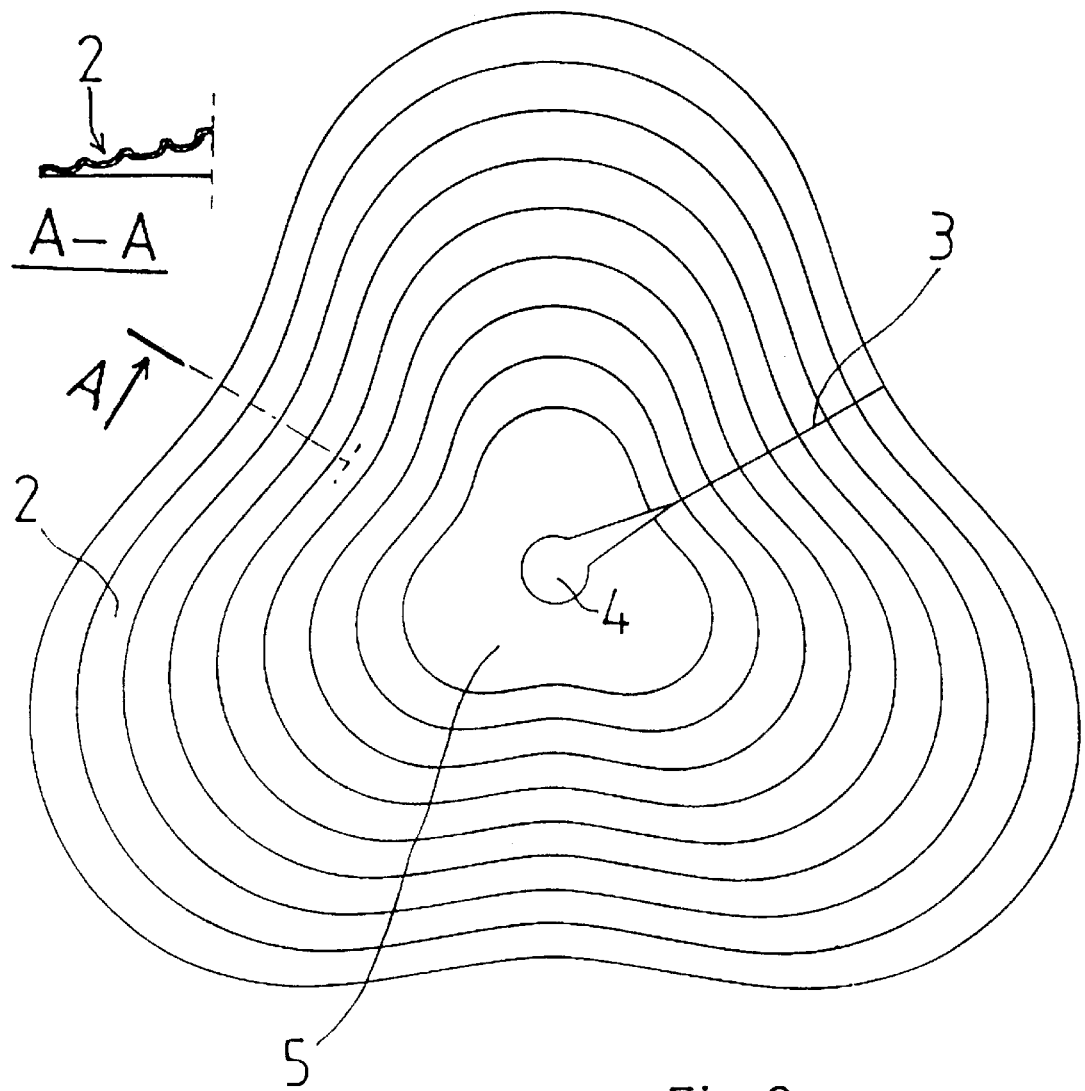

FIG. 2 is the shoe viewed from above.

In FIG. 1 the shoe is illustrated from the side. The shield is upward convex, whereat the wind cannot blow it up from the edge. The shoe is made, for instance, of mouldering recyling fibre or pulp. The most applicable ways of manufacture are pressing into curved shape, casting into shape or moulding into cup shape. A finished shoe retains it cup shape regardless of slit 3 as per FIG. 2. The shoe's natural adherence to the ground or the plants under it is improved adding glue to the material, at least on the sheet bottom face. For instance, starch or wallpaper paste is used as such glue matter.

In one shoe embodiment the fibre bonds are of such kind that they weaken on getting wet and make the shield sink to the ground.

It is advantageous to mix also other materials into the shoe material so that when functioning as insecticide the material can contain hardwood tar or its by-products, also bird-cherry bark flour or in the mixture a flour of natural products has been used, which moles avoid to bite.

Further, in the shoe material also microorganisms can be mixed, for instance bacteria, virus, spores or seeds. These are so chosen that they are beneficial for the plant. For instance, they inhibit harmful growth of fungi or they make useful fungi grow.

As nutrient the material can comprise pro shoe 3–20 g ash, 2–10 g appetite or biotite, 1–5 g boracium or 1–5 g potassium. All of these can be used simultaneously or some of them selectively.

FIG. 2 shows the shoe from above, where channels 2 on the convex portion of this embodiment are visible and circling around the shoe. Section A—A shows the profile of channels 2. The channels collect water, soil and falling or hovering litter as ballast onto the shoe and secure adhering of shoe to the ground.

Instead of channels 2 pockets, cavities or similar can be used on the convex portion. Thanks to the triangularity, the convex form is easily accomplished. So is also anchoring to the ground from three points. In the shoe centre there is a hole, most suitably surrounded by concave portion 5. Slit 3 makes fitting of shoe around the plant bottom possible without threading.

Most suitably the plant shoe is through-dyed in a natural color so that it won't change colour with time. Further, for identification, the shoe can also be furnished with a color code, for instance a color spot. Most advantageously, the shoe is made of recyling fibre, pulp, chips, cuttings, grass or a combination of those. In a few years the shoe material decays into nature and looses its protective effect gradually. The object is that the plant has by then passed the most critical stages of its growth.

What is claimed is:

1. A protective shoe for use at the roots of a planted seedling or a natural seedling and having a central portion having a hole for the paint stem at its center and a slit cut from that hole to the outer edge of the shoe for fitting the shoe around the plant, the shoe being generally, continuously; and upwardly convex from its outer edge inwardly to the central portion the shoe being made from a flat sheet which is shaped to have material collecting channels, cavities or pockets.

2. A protective shoe according to claim 1, wherein the shoe is made of a stiff material which maintains its generally convex shape.

3. A protective shoe according to claim 1, wherein the channels are ring grooves encircling the shoe.

4. A protective shoe according to claim 1, wherein the convex portion is centered around the said hole.

5. A protective shoe according to claim 1, including an adhesive on the bottom face of the shoe.

6. A protective shoe according to claim 1, wherein the shoe material has had added to it an additive, taken from the group consisting of repellents, microorganisms, seeds, trace elements and slow-soluble nutrients.

7. A protective shoe according to claim 1, wherein the shoe viewed from above, is of a generally triangular form.

8. A protective shoe according to claim 1, wherein the material of the shoe contains fiber bonds which weaken on becoming wet to thereby make the shoe deform and sink into the ground when wet.

9. A protective shoe for use at the roots of a planted seedling or a natural seedling and having a hole for the plant stem in its center and a slit cut between the hole and the shoe edge for fitting the shoe around the plant, the shoe being a convex flat sheet made of molding material by pressing, casting or shaping and wherein its convex portion has material collecting channels, cavities or pockets, and including an adhesive on the shoe bottom.

10. A protective shoe for use at the roots of a planted seedling or a natural seedling and having a hole for the plant stem in its center and a slit cut between the hole and the shoe edge for fitting the shoe around the plant, the shoe being a convex flat sheet made of molding material by pressing, casting or shaping and wherein its convex portion has material collecting channels, cavities or pockets, and wherein the shoe material includes an additive taken from the groove consisting of repellents, microorganisms, seeds, trace elements and slow-soluble nutrients.

11. For use at the roots of a planted seedling or a natural seedling and having a hole for the plant stem in its center and a slit cut between the hole and the shoe edge for fitting the shoe around the plant, the shoe being a convex flat sheet made of molding material by pressing, casting or shaping and wherein its convex portion has material collecting channels, cavities or pockets, and wherein the shoe viewed from above, is of a triangular form.

12. For use at the roots of a planted seedling or a natural seedling and having a hole for the plant stem in its center and a slit cut between the hole and the shoe edge for fitting the shoe around the plant, the shoe being a convex flat sheet made of molding material by pressing, casting or shaping and wherein its convex portion has material collecting channels, cavities or pockets, and wherein the material of the shoe contains fiber bonds which weaken upon getting wet to thereby cause the shoe to deform and sink into the ground.

* * * * *